United States Patent Office 3,302,920
Patented Feb. 7, 1967

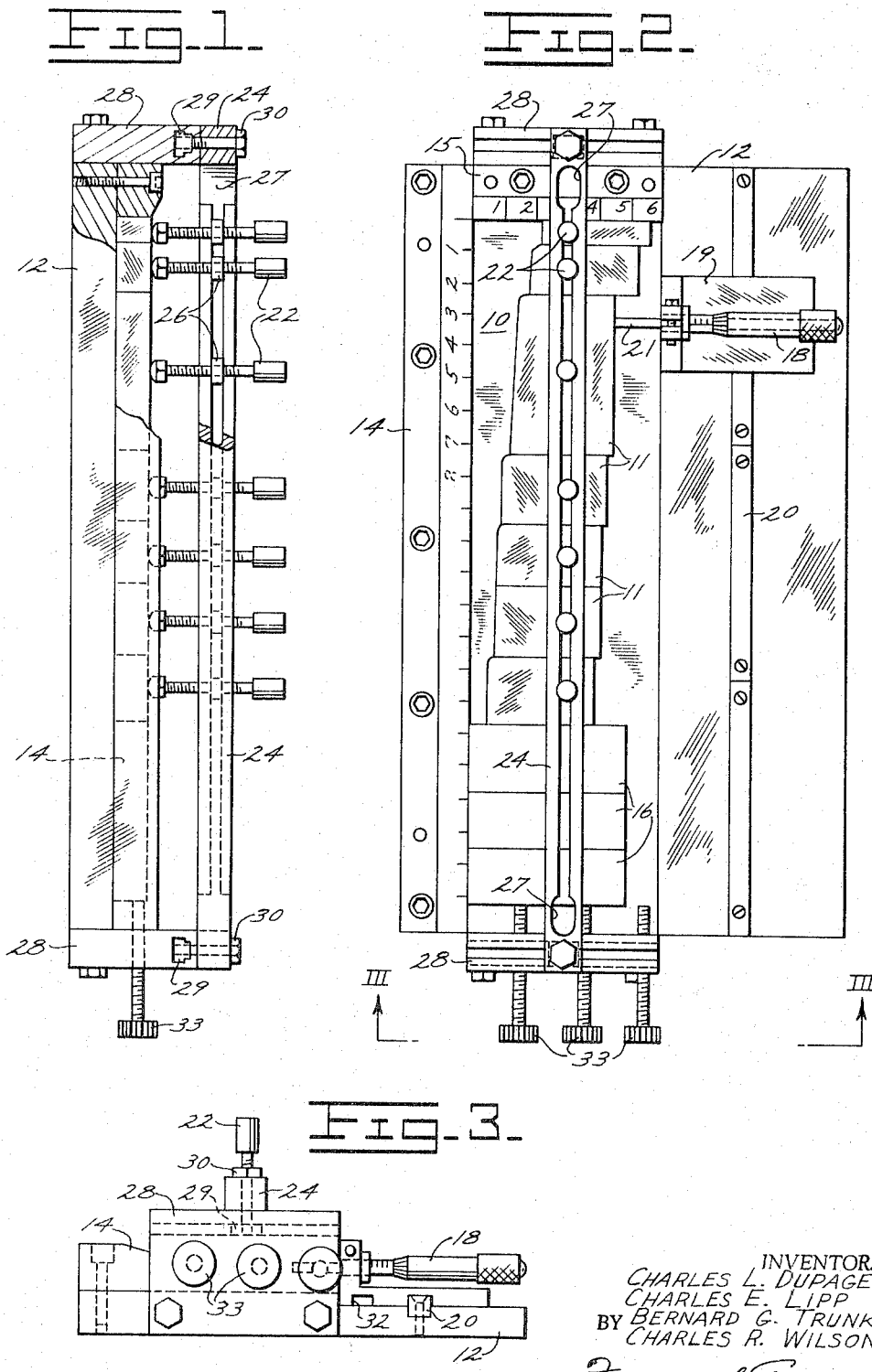

3,302,920
APPARATUS FOR PRODUCING TEMPLATES
Charles L. Dupage, Pekin, Charles E. Lipp, Peoria, Bernard G. Trunk, East Peoria, and Charles R. Wilson, Pekin, Ill., assignors to Caterpillar Tractor Co., Peoria, Ill., a corporation of California
Filed Sept. 25, 1964, Ser. No. 399,282
2 Claims. (Cl. 249—156)

This invention relates to means for making highly precise machine tool templates at low cost.

Tracer lathes, which are quite commonly used in industry, employ a stylus which follows a template and, through an electro-mechanical tracer control, guides the cutting tool to shape a workpiece in the configuration dictated by the template. Such templates conventionally comprise a flat piece of metal with one edge presenting a profile precisely like that of the part to be turned on the lathe. In many machine parts made by this process a dimensional tolerance not exceeding plus or minus .0005 inch is specified. Templates of this kind are made in a precision machine shop at a very high cost and, where many different types and sizes of parts are being made on tracer lathes, very substantial sums are invested in templates.

It is the object of the present invention to provide means for producing low cost templates by casting a plastic or ceramic material rather than by machining and to provide apparatus capable of being assembled in many forms for producing molds for such templates.

Further and more specific objects and advantages of the invention and the manner in which it is carried into practice are made apparent in the following specification wherein the invention is described in detail by reference to the accompanying drawing.

In the drawing:

FIG. 1 is a view in side elevation with parts in section of a template form embodying the present invention;

FIG. 2 is a plan view of the same template form; and

FIG. 3 is a view in end elevation taken from the plane indicated at III—III in FIG. 2.

In FIG. 2 of the drawing an area 10 is shown into which a plastic or ceramic material may be poured to harden and produce a flat article having one one side the configuration provided by one side of a plurality of blocks such as shown at 11. This cavity or mold is produced on a base plate 12 with a wall 14 secured along one edge and a wall 15 secured along one end. These walls produce one side and one end of the form, the opposite side being produced by the blocks 11 and the opposite end being produced by one of a group of end blocks or spacers 16. The blocks and spacers 11 and 16 are shown as assembled to produce a form for a template for making a dead shaft upon which a wheel or sprocket may be mounted with bearings and other accessories. The shaft will be round, having been formed on a lathe, and will have a profile like that of the wall formed by the blocks 11 so that it may have straight and tapered portions and steps with fillets as is customary. Since such shafts are required in different sizes, it is possible to use many of the blocks 11 in other combinations, using more or fewer blocks as the case may be, to make a larger or smaller template. Consequently with a set of blocks precisely machined, templates of similar articles of many different sizes can be made at very low cost.

The side wall 14 and the end wall 15 may be calibrated in inches as shown if desired, and the blocks are precisely positioned with respect to the side wall 14 by a micrometer 18 supported on a block 19 slidable on a rail 20 fixed to the surface of the base plate 12. The micrometer has a feeler end 21 which may be brought against the blocks one at a time to position them precisely with respect to the side wall 14, and in accordance with the specifications of the templates being made. As each block is properly positioned it may be clamped in place with clamping screws such as indicated at 22. These clamping screws are slidably retained in a bridge shown at 24. The bridge is slotted for reception of nuts 26, and the clamping screws and the nuts may be inserted into place near the ends of the bridge where enlarged openings 27 are provided. The bridge rests on supports 28 at opposite ends of the base plate which supports are also slotted for the reception of nuts 29 into which screws 30 are threaded. This enables the bridge to be adjusted from side to side to bring clamping screws 22 over the blocks when they occupy different positions to make templates of different sizes.

The micrometer support block 19 is also made adjustable by having an extra slot 32 (see FIG. 3) formed therein to be guided on the rail 20 when the micrometer is moved outwardly with respect to the wall 14. Clamping screws 33 extend through one of the bridge supports 28 to engage the ends of the spacers 16 and urge all of the spacers and blocks into close relationship with each other.

With a form produced in the manner illustrated in the drawing, a template is made by pouring a hardenable substance into the form and permitting it to set. It is possible that many substances may be used for this purpose, and epoxy die-casting resins are available on the market and have proven satisfactory.

We claim:

1. An apparatus for making precision templates having one profiled edge for use in tracer lathes comprising a base plate, a side wall and an end wall on said base plate, means for securing contoured blocks and spacers against the base plate in spaced relationship to the side and end walls to form a mold into which a hardenable substance may be poured, a micrometer, a support for the micrometer, and means for guiding the support for sliding movement parallel to the side wall for adjustment of the micrometer in a direction normal to the side wall for the accurate spacing of said contoured blocks with respect to the side wall.

2. The apparatus of claim 1 with means to vary the distance of the bridge and micrometer with respect to the side wall.

References Cited by the Examiner
UNITED STATES PATENTS

| | | | |
|---|---|---|---|
| 765,365 | 7/1904 | Lamp'l | 249—158 X |
| 785,272 | 3/1905 | Robbins | 249—158 X |
| 1,364,534 | 1/1921 | Walter | 33—175 |
| 2,404,314 | 7/1946 | Rogers | 249—158 X |
| 2,879,602 | 3/1959 | Powers | 33—174 |

J. SPENCER OVERHOLSER, *Primary Examiner.*

E. MAR, *Assistant Examiner.*